(No Model.)
A. FLICK.
TRAP FOR LOBSTER FISHING.
No. 390,218. Patented Oct. 2, 1888.
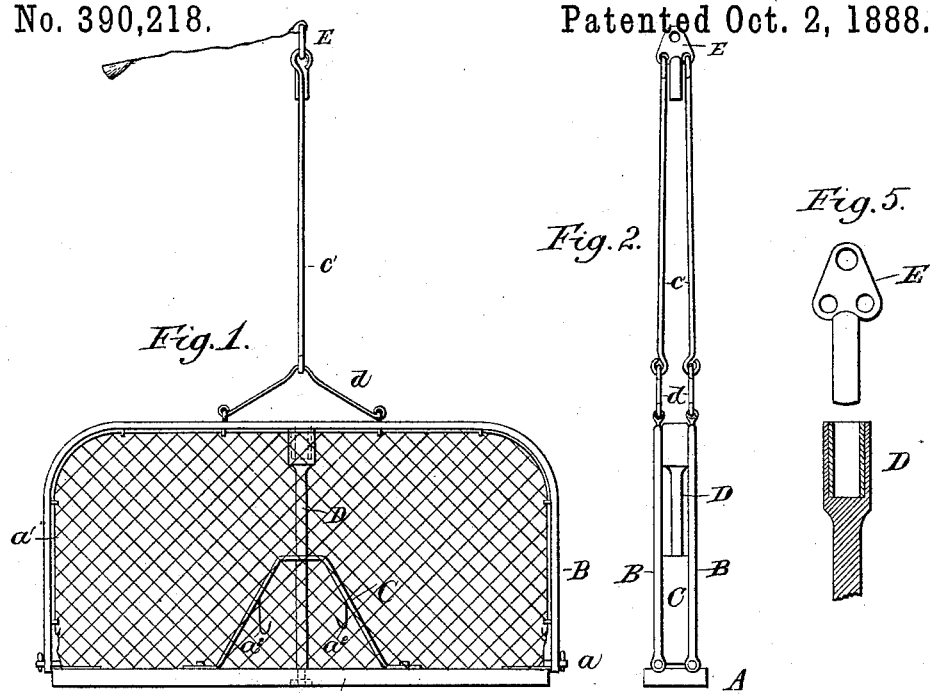
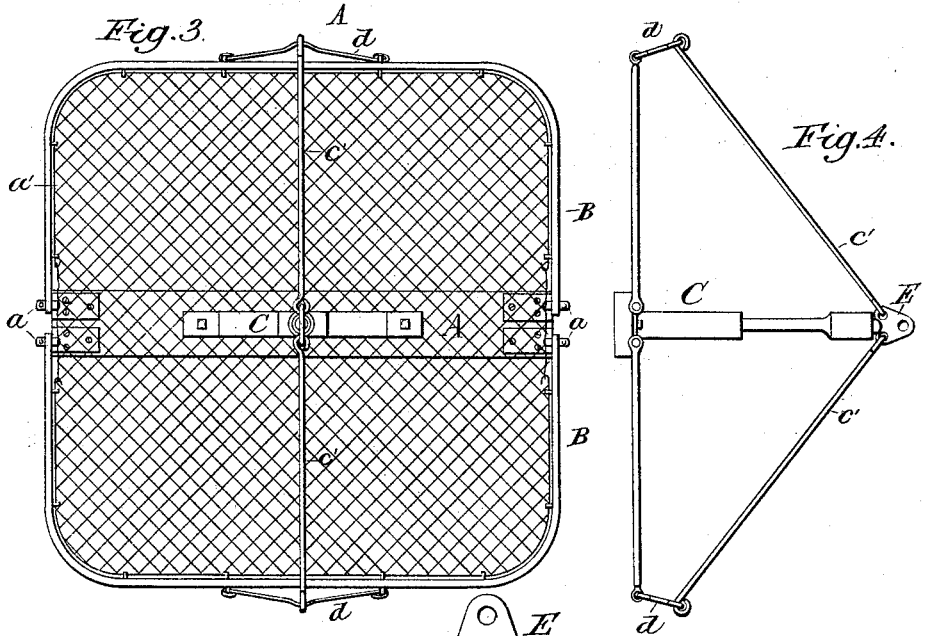
Witnesses
John T. Ross
Ernest H. Armstrong
Inventor
Andrew Flick

UNITED STATES PATENT OFFICE.

ANDREW FLICK, OF HALIFAX, NOVA SCOTIA, CANADA.

TRAP FOR LOBSTER-FISHING.

SPECIFICATION forming part of Letters Patent No. 390,218, dated October 2, 1888.

Application filed August 15, 1887. Serial No. 247,040. (No model.) Patented in Canada February 2, 1887, No. 25,900.

*To all whom it may concern:*

Be it known that I, ANDREW FLICK, of the city of Halifax, in the county of Halifax, in the Province of Nova Scotia, Canada, have invented a new and useful Improvement in Traps used for Lobster-Fishing, which improvement is fully set forth in the following specification, reference being had to accompanying drawings.

The object of my invention is to allow of fishing being conducted in deep water and in rough weather, and also of preventing the escape of any fish that is in the trap when it is closed.

The trap is illustrated in the side elevation, Figure 1, and in end view, Fig. 2, both views showing the trap closed. Fig. 3 is a plan view. In this view the trap is open and ready for use.

A is a wooden cross-bar to which are secured in a suitable manner the pintles *a a a a*. An iron frame, B, works freely on said pintles. A smaller rod, *a'*, is secured to inside of frame for the purpose of fastening a net thereto. On this cross-bar A is also secured an angular brace, C, Fig. 1. This brace is to afford a support for the rod D, and also to hold hooks $a^2 a^2$ to carry bait on. To cross-bar A is also secured the round upright rod D, the upper end of which, being made larger, is bored out to receive a piece of rubber tube or a piece of cork of tubular form, as shown in sectional view, Fig. 5.

Pin E, Fig. 4, serves to connect the side rods, *c' c'*, as shown. Link-pieces *d d* are secured to frame B and connected to side rods, as shown, this combination serving to keep the trap open. When on a rocky or uneven bottom, a rope and buoy is secured to pin E, as shown in Fig. 1.

Fig. 6 is another method of fitting the tripping apparatus of the trap. On upper end of rod D two springs are secured, of form shown. Pin E is made large enough to bore out, so as to fit tightly on the springs.

The manner of fishing with trap is as follows: The frame A being opened and pin E inserted in end of rod D, bait is put on hooks $a^2 a^2$ and trap is lowered to bottom, the buoy serving to locate position of trap. When it is required to raise trap, the line is seized, and by a smart pull pin E is disengaged from rod D and trap is closed, thus preventing the fish from escaping.

I claim as my invention—

In a lobster-trap having a base-strip on the opposite sides of which are hinged the net-supporting frames, the combination therewith of a centrally-located post and end-looped arms extending inwardly from said frames and connected to a clevis, the latter having on its lower end a pin or plug fitted to enter the tubular end of said post, whereby through the rods the frames are distended and withdrawn therefrom for closing the frames when the clevis is drawn upon, substantially as described.

Halifax, July 19, 1887.

ANDREW FLICK.

Witnesses:
 BEV. SATLER,
 JOHN T. ROSS.